US006089528A

United States Patent [19]

Hajek, Jr. et al.

[11] Patent Number: 6,089,528

[45] Date of Patent: Jul. 18, 2000

[54] POPPET VALVE CONTROL WITH SEALING ELEMENT PROVIDING IMPROVED LOAD DRIFT CONTROL

[75] Inventors: Thomas J. Hajek, Jr., Lockport; Srikrishnan T. Tolappa, Aurora, both of Ill.

[73] Assignee: Caterpillar Inc., Peoria, Ill.

[21] Appl. No.: 09/216,439

[22] Filed: Dec. 18, 1998

[51] Int. Cl.[7] .......................... F16K 31/34; F16K 31/383; F16K 31/40

[52] U.S. Cl. .......................... 251/28; 251/30.02; 251/35; 251/44

[58] Field of Search .................................... 137/485, 486, 137/488, 489, 596.14, 596.17, 596.18, 491, 492, 492.5, 596.16; 251/35, 44, 30.02, 28, 30.05

[56] References Cited

U.S. PATENT DOCUMENTS

| | | | |
|---|---|---|---|
| 3,175,800 | 3/1965 | Donner et al. | 251/35 |
| 4,535,809 | 8/1985 | Andersson | 137/596.14 |
| 4,593,715 | 6/1986 | Stich et al. | 251/35 |
| 4,662,601 | 5/1987 | Andersson | 251/35 |
| 4,905,959 | 3/1990 | Andersson | 251/35 |
| 4,945,723 | 8/1990 | Izumi et al. | 137/596.14 |
| 5,137,254 | 8/1992 | Aardema et al. | 251/35 |
| 5,253,672 | 10/1993 | Uehara et al. | 251/35 |
| 5,255,705 | 10/1993 | Uehara et al. | 251/35 |
| 5,421,545 | 6/1995 | Schexnayder | 137/489.5 |
| 5,645,263 | 7/1997 | Aardema | 137/596.14 |

*Primary Examiner*—George L. Walton
*Attorney, Agent, or Firm*—Haverstock Garrett & Roberts; J. W. Burrows

[57] ABSTRACT

A control for a poppet valve providing improved load drift control is disclosed. The control includes a valve member operably moveable between a closed position and a range of open positions for allowing flow from an associated poppet control chamber, and a sealing element disposed between a first cavity portion in communication with the control chamber and a second cavity portion for preventing leakage around the valve member therebetween. The sealing element is supported by structure which maintains the sealing element in close alignment with a bore in which the valve member is supported, the sealing element in several embodiments being integrally formed with the bore and in other embodiments being self aligning with the bore.

10 Claims, 3 Drawing Sheets

POPPET VALVE CONTROL WITH SEALING ELEMENT PROVIDING IMPROVED LOAD DRIFT CONTROL

TECHNICAL FIELD

This invention relates generally to controls for poppet valves and the like, and more particularly, to a control having a sealing element which provides improved load drift control, as well as other advantages.

BACKGROUND ART

Poppet valves are used in a wide variety of applications, such as for controlling the exhausting of hydraulic fluid from cylinders, motors and other working elements. Fluid flow from an inlet port through the poppet valve to an outlet port thereof is typically controlled by controllably moving the poppet between a closed position in sealed relation to a seat and a range of open positions displaced from the seat. A basic type of poppet valve has at least one throttling slot through the poppet to communicate the pressure in the inlet port to a control chamber at the backside of the poppet. The fluid pressure in the control chamber exerts a closing force on the poppet holding it against the seat. A spring is also generally used to hold the poppet against the seat when the pressure conditions in the inlet port, control chamber, and an outlet port, are equalized.

Controls for operably controlling the opening of the poppet are well known. Such known controls typically operate by regulating communication between the control chamber and another location such as the outlet port of the poppet through a variable regulating or flow control orifice under control of a pilot fluid signal, a solenoid, or the like. The variable regulating or flow control orifice is normally closed so that fluid pressure in the control chamber equals the inlet pressure and the poppet is urged against the seat by the pressure in the control chamber. Opening of the poppet is achieved by controllably opening the variable regulating or flow control orifice to communicate the control chamber with the outlet port or other location. This creates a pressure drop through the throttling slot in the poppet such that the inlet pressure urges the poppet from the seat as the control pressure drops below the balance pressure. The degree of opening of the poppet is subsequently controlled by controlling the flow through the variable regulating or flow control orifice to regulate the balance condition and the flow through the throttling slot.

Commonly, some leakage of fluid is expected to occur through the control apparatus, and a fluid drain to tank is typically provided for draining such leakage. However, in certain applications, for instance wherein the poppet is used as a load control device, such leakage is a problem as it can make it difficult for the poppet to be maintained in a balanced condition, resulting in load drift, that is, movement of the actuator or other working element controlling the load.

Additionally, there are certain disadvantages to allowing the leakage to be removed via a separate drain to tank. Such disadvantages include that the poppet becomes less controllable as the pressure drop from load pressure to the drain across the control is generally not the same as the pressure drop across the poppet valve. The poppet valve also becomes sensitive to down stream pressure (back pressure) and can become destabilized at high back pressure, that is, it can go to a fully open position and fail to respond to control inputs. Also, when flow is allowed to drain to tank, voiding problems can arise during regeneration operation involving a hydraulic cylinder circuit operating under an overrunning load. Further, back pressure is often introduced into the line to tank in order to address the voiding problem when operating with overrunning loads. However, addition of back pressure has been found to destabilize the poppet.

Accordingly, the present invention is directed to overcoming one or more of the problems as set forth above.

DISCLOSURE OF THE INVENTION

In one aspect of the present invention a control for a poppet valve including a sealing element providing improved load drift control is disclosed. The control includes a housing defining a first cavity portion and a second cavity portion connected in communication with the first cavity portion. The housing includes a first port adapted for communicating the first cavity portion with a control chamber of the poppet valve for receiving fluid therefrom, a second port adapted for communicating the first cavity portion with another location for receiving the fluid. A valve seat extends around the first cavity portion between the first port and the second port. The control includes a valve member having a first end portion, an opposite second end portion and an axis extending therebetween. The first end portion is located in a bore in the housing in communication with the first cavity portion for supporting the valve member for axial movement between a closed position in sealed relation to the valve seat, and a range of open positions displaced from the valve seat wherein flow of the fluid past the valve seat between the first port and the second port is allowed for controllably opening the poppet valve responsive to an opening force applied against the valve member. The second end portion of the valve member extends between the first cavity portion and the second cavity portion.

At least one biasing member is disposed for resiliently opposing the movement of the valve member toward the open positions, and the sealing element is disposed between the first cavity portion and the second cavity portion around the second end portion of the valve member. The sealing element forms a substantially sealed condition around the second end portion of the valve member for limiting fluid leakage between the first cavity portion and the second cavity portion, and the structure supports sealing element in alignment with the bore.

BRIEF DESCRIPTION OF THE DRAWINGS

For a better understanding of the present invention, reference may be made to the accompanying drawings in which.

BEST MODE FOR CARRYING OUT THE INVENTION

Figure 1:
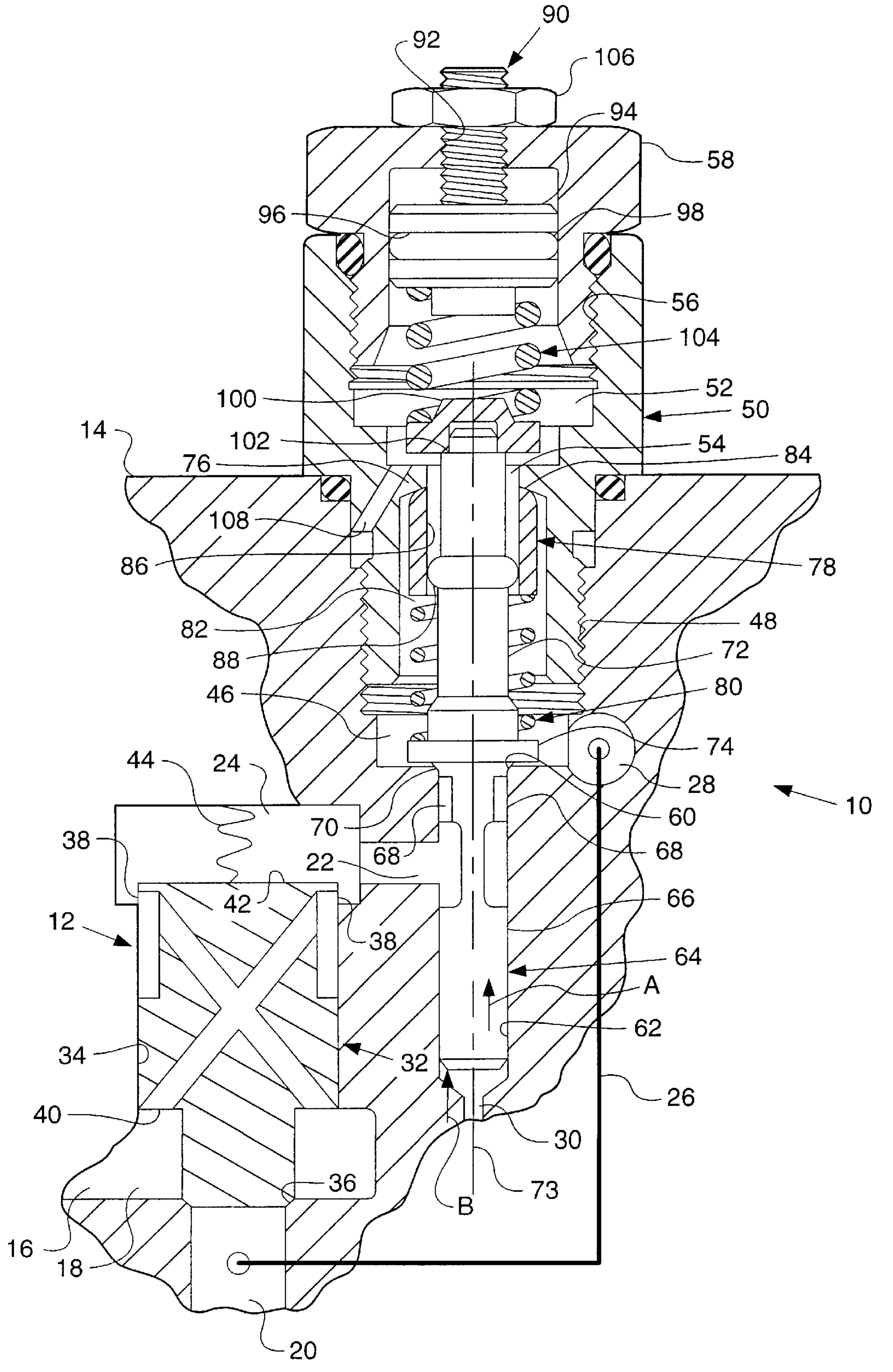
FIG. 1 is a schematic representation in partial cross-section of one embodiment of a control with a sealing element for improved load drift control according to the present invention in association with a poppet valve.

Referring now to the drawings, FIG. 1 shows a control 10 constructed and operable according to the teachings of the present invention for operative control of a poppet valve 12. Control 10 and poppet valve 12 are both largely contained in a housing 14 which also forms a main fluid passage 16 connected in communication with an inlet port 18 of poppet valve 12. Housing 14 additionally forms an outlet port 20 of valve 12; an input port 22 of control 10 in communication with a control chamber 24 of poppet valve 12; a return conduit 26 communicating an outlet port 28 of control 10 with outlet port 20 of poppet valve 12; and a pilot signal conduit 30 communicating control 10 with a pilot signal source (not shown).

Poppet valve 12 includes a poppet 32 disposed for axial movement in a bore 34 in housing 14 between a closed position as shown in sealed engagement with an annular seat 36 extending around outlet port 20 for controlling fluid passage between inlet port 18 and outlet port 20, and a range of open positions (not shown) in spaced relation to seat 36 for allowing fluid flow between inlet port 18 and outlet port 20. Poppet 32 includes a plurality of throttling slots 38 thereacross communicating inlet port 18 with control chamber 24. Poppet 32 further includes an annular reaction surface 40 communicating with inlet port 18 such that fluid under pressure in inlet port 18 will urge poppet 32 toward the open position. Another reaction surface 42 is located on poppet 32 opposite reaction surface 40 and defines a portion of control chamber 24 such that fluid under pressure in control chamber 24 will act against poppet 32 in opposition to the force exerted thereagainst by pressure in inlet port 18. A compression spring 44 resiliently urges poppet 32 toward seat 36.

Housing 14 forms a first cavity portion 46 and a threaded opening 48 in communication with first cavity portion 46. Housing 14 includes a valve bonnet 50 threadedly mounted in threaded opening 48 in sealed relation to first cavity portion 46, valve bonnet 50 defining a second cavity portion 52. Valve bonnet 50 includes a first open end 54, and an opposite threaded second open end 56 which threadedly receives a threaded nut 58 in sealed relation thereto. First cavity portion 46 is in fluid communication with inlet port 22 and outlet port 28 and includes a circumferential valve seat 60 disposed therebetween. First cavity portion 46 further includes an elongate cylindrical guide bore 62 adjacent valve seat 60 in communication with pilot signal conduit 30.

An elongate valve member 64 extends between first cavity portion 46 and second cavity portion 52. Valve member 64 includes a cylindrical first end portion 66 supported in guide bore 62; a plurality of variable flow control orifices 68 at circumferentially spaced location around the valve member; a tapered, circumferential valve portion 70 sealably engagable with valve seat 60; and a second end portion 72 opposite first end portion 66. An axis 73 extends through valve member 64 between first end portion 66 and second end portion 72. Valve member 64 is movable axially between a closed position with valve portion 70 sealably engaged with valve seat 60, and a range of open positions wherein valve portion 70 is axially displaced from valve seat 60, to allow fluid flow through variable flow control orifices 68 past valve seat 60 between inlet port 22 and outlet port 28. Displacement of valve member 64 toward the open positions is denoted by the arrow A, and is initiated by a fluid input or control signal communicated to first end portion 66 via pilot signal conduit 30 to apply an opening force against valve member 64 as denoted by the arrow B.

An annular shoulder 74 extends around valve member 64 intermediate valve portion 70 and second end portion 72. An annular shoulder 76 extends around valve bonnet 50 intermediate first cavity portion 46 and second cavity portion 52. And, a cylindrical sealing element 78 and a first compression coil spring 80 are disposed between shoulder 74 and shoulder 76, spring 80 being in a compressed state so as to urge valve member 64 into sealed engagement with valve seat 60 and oppose displacement of valve member 64 toward the open positions. More particularly, sealing element 78 includes a first axial end portion 82 in abutment with spring 80 and an opposite second axial end portion 84 in abutment with shoulder 76, axial end portion 84 having a convex rounded cross sectional shape and shoulder 76 having a mating concave rounded cross sectional shape, such that a sealed condition is formed between axial end portion 84 and shoulder 76. Sealing element 78 has a smooth cylindrical inner surface 86 extending between axial end portions 82 and 84, and second end portion 72 of valve member 64 includes a rounded seal ring 88 extending therearound in position for sealably engaging inner surface 86 both when valve member 64 is stationary and moving. Importantly, the sealed conditions formed between sealing element 78 and shoulder 76, and sealing element 78 and seal ring 88, substantially limit fluid leakage from first cavity portion 46 to second cavity portion 52. Additionally, the curved interfaces between sealing element 78, shoulder 76 and seal ring 88 provide a self aligning capability such that the sealed condition between first cavity portion 46 and second cavity portion 52 is maintained throughout the range of movement of the valve member.

Control 10 further includes an adjusting screw 90 threadedly mounted in a threaded aperature 92 through threaded nut 58. Adjusting screw 90 includes a first spring retainer 94 which includes an annular groove 96 therein including an O-ring 98 forming a sealed condition with nut 58. A second spring retainer 100 is mounted to a stepped end 102 of valve member 64 in spaced, opposed relation to first spring retainer 94, and a second compression coil spring 104 is disposed in the space between spring retainers 94 and 100 for opposing movement of valve member 64 in the direction A. The compression of spring 104 and the compression of spring 80 are adjustable by threadedly moving adjusting screw 90 relative to nut 58, screw 90 being securable in a desired position by threaded engagement with a locking nut 106.

In operation, the sealed engagement between second axial end portion 84 of sealing element 78 and shoulder 76, and the sealed engagement between seal ring 88 and inner surface 86 of the sealing element combine to prevent any substantial leakage of fluid from first cavity portion 46 to second cavity portion 52, the rounded shape of second axial end portion 84, shoulder 76 and seal ring 88 providing the above-mentioned self aligning capability such that the sealed condition is maintained if axial alignment is not present with guide bore 62. Additionally, the self aligning capability has utility for allowing more free axial movement of the valve member 64. This capability to maintain a sealed condition between the first and second cavity portions has been found to virtually eliminate load drift due to leakage, which is an important object of the present invention. As a precautionary measure, a supplementary drain line 108 is connected in communication with second cavity portion 52 to drain any leakage that may occur.

Figure 2:
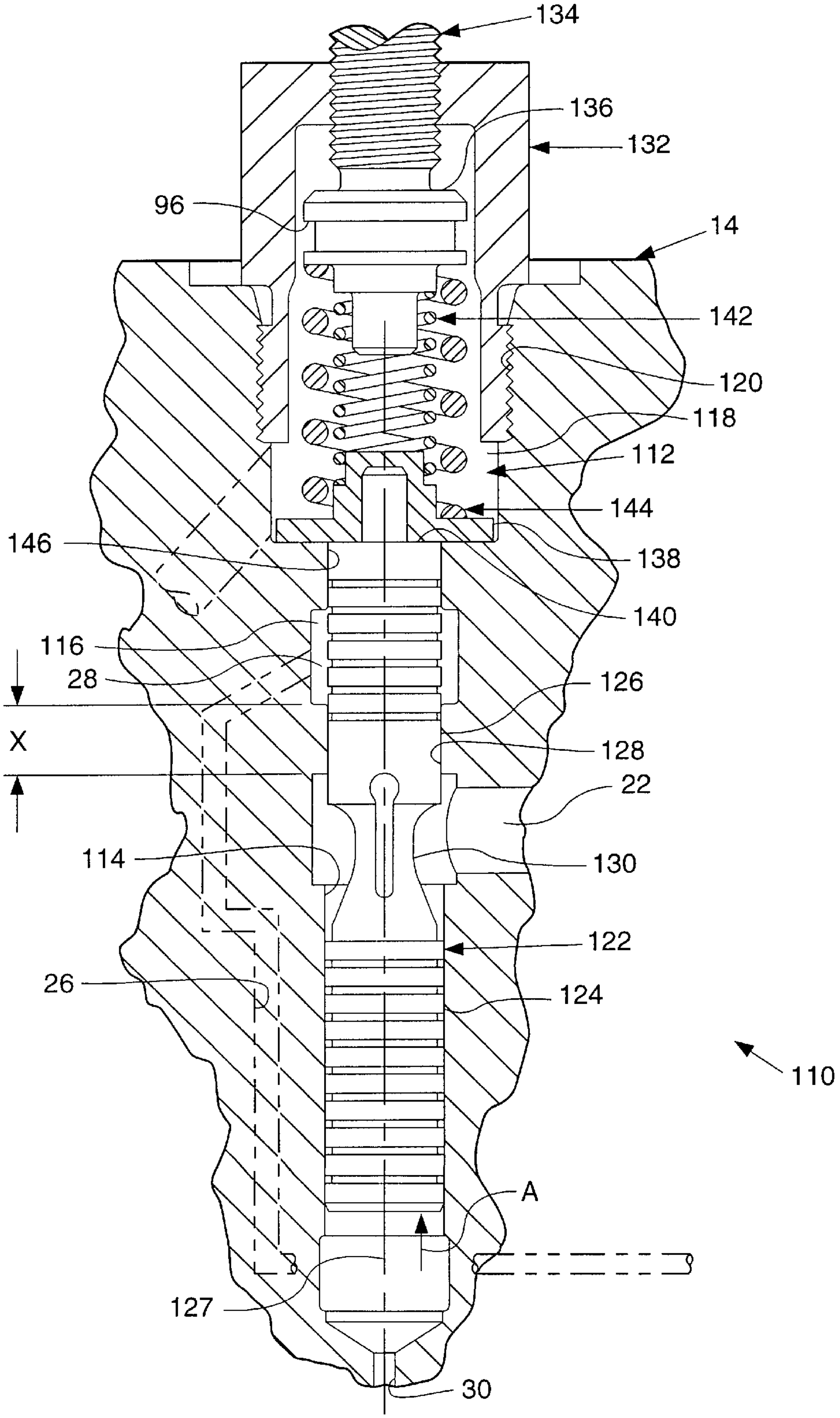
FIG. 2 is a schematic representation in partial cross-section of another embodiment of a control with a sealing element for improved load drift control according to the present invention.

Turning to FIG. 2, another embodiment 110 of a control for a poppet valve, such as a poppet valve 12, constructed an operable according to the teachings of the present invention is shown, like parts of embodiment 110 and embodiment 10 being identified by like numbers. Control 110 is located and largely contained in a housing 14 which also preferably contains a poppet valve, such as poppet valve 12 (not shown), control 110 having an inlet port 22 connected in fluid communication with a control chamber of the poppet valve, the control additionally including an outlet port 28 connected in fluid communication with a return conduit 26 for delivering fluid from the poppet valve to a location down stream thereof, or the like. Housing 14 forms a cylindrical cavity 112 containing control 110. Cavity 112 includes a spool bore 114 which communicates at one end with a pilot signal conduit 30, and at an opposite end with a first cavity portion 116 communicating with inlet port 22 and outlet 28. Cavity 112 includes a second cavity portion 118 communicating with a threaded opening 120. An elongate spool valve member 122 is operably located in cavity 112. Valve member 122 includes a first end portion 124, an opposite second end portion 126, and a longitudinal axis 127 extending therebetween. A cylindrical valve seat 128 is located in first cavity portion 116 intermediate inlet port 22 and outlet port 28, valve member 122 being axially moveable between a closed position wherein second end portion 126 thereof is sealably engaged with valve seat 128, and a range of open positions wherein the second end portion is spaced from the valve seat such that a variable flow control orifice 130 of the valve member is positioned to provide communication between inlet port 22 and outlet port 28. It is additionally anticipated that the substantial length X of valve seat 128 will result in a somewhat longer than usual "dead band", that is time lag between appearance of an input pilot signal or other opening force acting against valve member 122, and resultant axial movement of the valve member. To off set such dead band, second compression coil spring 144 can be of a sufficiently short length such that a timing gap is provided to allow displacement of the valve member by a distance corresponding to all or a portion of the length X of valve seat 128 prior to engagement with the second spring.

A valve bonnet 132 is threadedly mounted in opening 120 of control 110 and includes a threaded adjusting screw 134 mounted therein. Adjusting screw 134 includes a first spring retainer 136 having a circumferential groove 96 therearound for receiving an O-ring for forming a sealed condition around bonnet 132. A second stepped spring retainer 138 is mounted to a stepped end 140 of valve member 122, and a first compression coil spring 142 and a second compression coil spring 144 are disposed between spring retainers 136 and 138 for opposing movement of valve member 122 from the closed position as shown toward the range of open positions.

Importantly, control 110 includes a cylindrical sealing element 146 disposed between first cavity portion 116 and second cavity portion 118 around second end portion 126 of valve member 122. Sealing element 146 is diametrically only slightly larger than second end portion 126 of valve member 122 so as to form a substantially sealed condition therearound both when the valve member is stationery and during movement thereof for limiting fluid leakage between first cavity portion 116 and second cavity portion 118. Sealing element 146 is integrally formed with and supported by housing 14 so as to be in close axial alignment with spool bore 114. In this regard, it is contemplated that sealing element 146 and spool bore 114 will be formed at the same time in housing 14, using the same tool, such that closed alignment and size can be maintained therebetween for a low leakage potential and resultant load drift.

Figure 3:
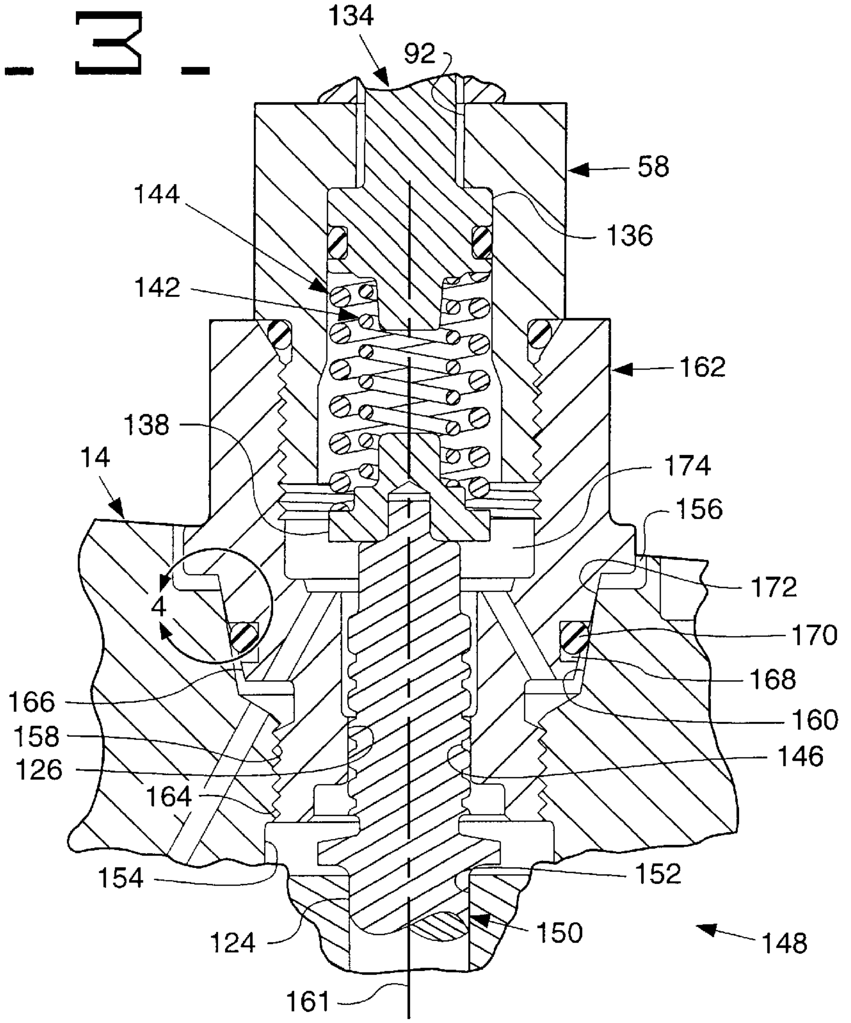
FIG. 3 is a fragmentary cross sectional view of another embodiment of a control according to the present invention.
Figure 4:
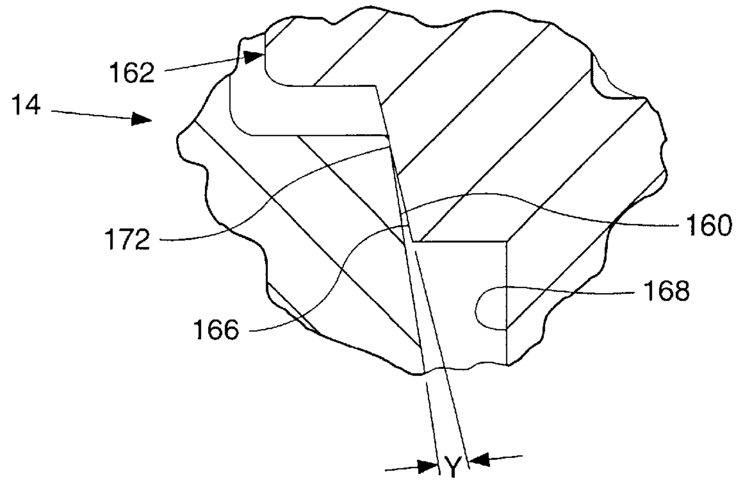
FIG. 4 is an enlarged fragmentary cross sectional view of the control of FIG. 3.

Turning to FIGS. 3 and 4, a second embodiment 148 of a spool type control according to the present invention is shown. Like parts of control 148 and controls 10 and 110 are identified with like numerals. Control 148 includes an elongate spool valve member 150 located in a cavity 152 in a housing 14. Cavity 152 includes a spool bore communicating at one end with a pilot signal conduit (not shown) and at an opposite end with a first cavity portion 154. Cavity portion 154 communicates at one location with an inlet port adapted for connection in communication with a control chamber of a poppet for receiving fluid therefrom and at another location with an outlet port for receiving the fluid, as explained above. Additionally, a valve seat (also not shown) extends around first cavity portion 152 intermediate the inlet port and outlet port, as explained above. First cavity portion 154 communicates with an opening 156 in housing 14. Opening 156 is partially defined by an internally threaded sidewall portion 158 and partially by a tapered annular sidewall portion 160. Importantly, the spool bore and the tapered annular sidewall portion 160 are closely axially aligned about an axis 161, and to achieve such close axial alignment, both can be formed using a single form tool providing the required precision. A valve bonnet 162 has a correspondingly threaded portion 164 threadedly engaged with threaded sidewall portion 158 and an annular outer tapered surface 166 positioned in opposing relation to tapered annular sidewall portion 160. Outer tapered surface 166 includes an annular groove 168 therein which receives an O-ring 170 in sealed engagement with tapered annular sidewall portion 160. Additionally, outer tapered surface 166 and tapered annular sidewall portion 160 are oriented with respect to longitudinal axis 161 at different angles, so as to engage along an annular line of contact 172 to align the valve bonnet with the spool bore.

Valve bonnet 162 includes a bore therethrough including a sealing portion 146 extending around second end portion 126 of valve member 150 forming a substantially sealed condition therewith to prevent leakage between first cavity portion 154 and a second cavity portion 174 located in valve bonnet 162. Sealing portion 146 is closely concentric with outer tapered surface 166 so as to be closely axially aligned with the spool bore. Again, to provide substantial protection against leakage and drift, sealing element 146 has a relatively long axial length and is closely sized diametrically with second end portion 126 of the valve member, a representative clearance therebetween being on the order of about 40 microns. Valve bonnet 162 additionally includes a threaded nut 58 which threadedly receives an adjusting screw 134 including a stepped spring retainer 136 located in spaced, opposed relation to a second stepped spring retainer 138 mounted to the end of valve member 150, a first compression coil spring 142 and a second compression coil spring 144 being disposed between spring retainers 136 and 138 and operable as explained above in reference to embodiment 110.

INDUSTRIAL APPLICABILITY

The present poppet valve control with a sealing element providing improved load drift control has utility for a wide variety of hydraulic system applications wherein near zero load drift is desirable. Examples include bucket and blade control systems for equipment used for excavating, earthmoving, construction, mining and the like.

Other aspects, objects and advantages of the present invention can be obtained from a study of the drawings, the disclosure and the appended claims.

What is claimed is:

1. A control for a poppet valve, comprising:

a housing defining a first cavity portion and a second cavity portion connected in communication with the first cavity portion, the housing including a first port adapted for selectively communicating the first cavity portion with a control chamber of the poppet valve for receiving fluid therefrom, a second port adapted for communicating the first cavity portion with another location for receiving the fluid, and a valve seat disposed within the first cavity portion between the first port and the second port;

a valve member having a first end portion, an opposite second end portion, and an axis extending therebetween, the first end portion being located in a bore in the housing in communication with the first cavity portion for supporting the valve member for axial movement between a closed position in sealed relation to the valve seat and a range of open positions displaced from the valve seat wherein flow of the fluid past the valve seat between the first port and the second port is allowed for controllably opening the poppet valve responsive to an opening force applied against the valve member, the second end portion extending between the first cavity portion and the second cavity portion;

at least one biasing member disposed for resiliently opposing the movement of the valve member toward the open positions; and a sealing element disposed between the first cavity portion and the second cavity portion around at least a portion of the second end portion of the valve member, the sealing element forming a substantially sealed condition around at least a portion of the second end portion of the valve member for limiting fluid leakage between the first cavity portion and the second cavity portion, and structure supporting the sealing element in alignment with at least a portion of the valve member.

2. The control, as set forth in claim 1, wherein the valve member is a spool valve and the sealing element and structure supporting the sealing element are integrally formed with the housing.

3. The control, as set forth in claim 1, wherein the at least one biasing member comprises a first compression spring having a first spring constant positioned in engagement with the valve member, a support member fixedly mounted to the housing in position for supporting the first compression spring in position for opposing the movement of the valve member toward the open positions, and a second compression spring having a second spring constant greater than the first spring constant disposed between the valve member and the support member for opposing the movement of the valve member toward the open positions.

4. The control, as set forth in claim 3, wherein the second spring is disposed in a space between the valve member and the support member, the space having a first length and the second compression spring having a second length when in an uncompressed condition, the first length being greater than the second length.

5. The control, as set forth in claim 1, wherein the housing further comprises an opening communicating with the second cavity portion and the structure supporting the sealing element comprises a valve bonnet fixedly disposed in the opening in supporting relation to the sealing element, the second end portion of the valve member, the sealing element, and the valve bonnet including cooperatively engagable portions allowing self alignment of the sealing element with the valve member.

6. The control, as set forth in claim 5, wherein the second end portion of the valve member includes a raised circumferentially extending portion extending therearound positioned for circumferential, sealed engagement with the sealing element.

7. The control, as set forth in claim 6, wherein the sealing element is a cylindrical shaped member including an axial end cooperatively and sealably engaged with an annular shoulder extending around the valve bonnet, the axial end surface and the shoulder having mating curved shapes.

8. The control, as set forth in claim 1, wherein the structure supporting the sealing element comprises a valve bonnet defining the second cavity portion, the valve bonnet being mounted in an opening in the housing defined by a tapered annular sidewall portion axially aligned with the bore, the valve bonnet including the sealing element and an outer tapered surface axially aligned with the sealing element, the outer tapered surface being engaged with the tapered annular sidewall portion thereby maintaining the sealing element in alignment with the valve member.

9. The control, as set forth in claim 8, wherein the valve member is a spool valve.

10. The control, as set forth in claim 1, further comprising a drain line communicating with the second cavity portion.

* * * * *